TRANSISTORIZED SYNC STRIPPER

Filed March 18, 1965

INVENTOR.
LEONARD J. BAUN
BY
Eugene M. Whitacre
Attorney

United States Patent Office 3,398,298

Patented Aug. 20, 1968

3,398,298

TRANSISTORIZED SYNC STRIPPER

Leonard J. Baun, Cinnaminson, N.J., assignor to Radio Corporation of America, a corporation of Delaware Filed Mar. 18, 1965, Ser. No. 440,732
8 Claims. (Cl. 307—235)

ABSTRACT OF THE DISCLOSURE

A transistorized sync stripper wherein a composite video signal is coupled via an emitter-follower transistor to an output switching transistor and wherein the synchronizing pulse peaks of the composite signal are clamped by a forward biased diode at the base of the emitter-follower.

This invention relates to a transistorized version of what is commonly referred to in the television field as a sync stripper. Such devices, whether called by their commonly used name or by their more formal name, synchronizing signal separators, are well known and understood in the art. Basically, they are devices which operate to strip or separate the synchronizing information from the picture information in a composite video signal. The stripped information can then be used to synchronize the time base system of a waveform monitor, or to synchronize the deflection system of a picture monitor or the electronic viewfinders of a television camera.

It is an object of the present invention to provide a transistorized sync stripper which is simple and inexpensive to construct.

It is another object of the invention to provide one which has a high immunity to noise.

It is an additional object to provide one which has a fast recovery rate and which is unaffected by hum and tilt on the incoming composite video signal.

It is a further object to provide one which produces a sharp output pulse during the synchronizing interval of the incoming signal.

In accordance with the invention, a transistorized sync sripper includes means for supplying a composite video signal including the synchronizing signal components and video signal components thereof. The sync stripper also includes a transistor switching stage for separating the synchronizing signal components from the video signal components. The stripper additionally includes a transistor coupling stage for coupling the composite signal to the transistor switching stage, the emitter of the coupling stage being electrically connected to the base of the switching stage. The transistorized sync stripper further includes means for clamping the peaks of the synchronizing signal components of the composite signal to a predetermined voltage level at the base of the coupling stage.

Figure 1:
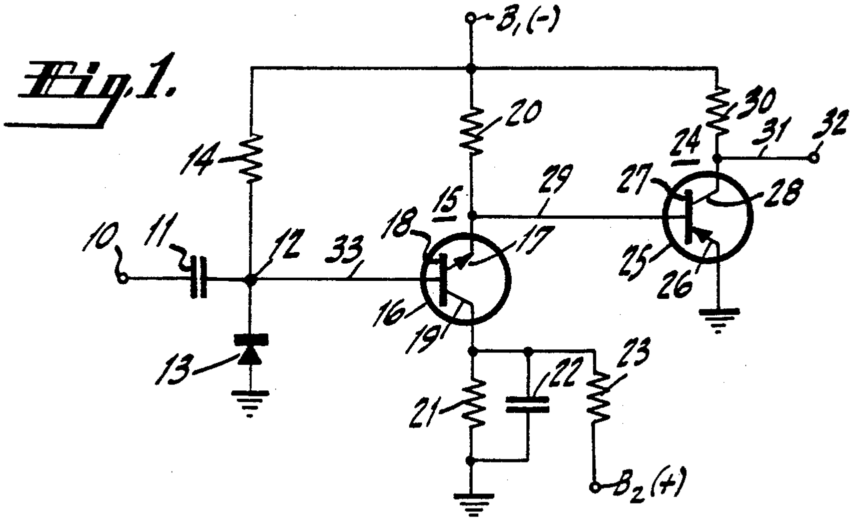
Figure 2:
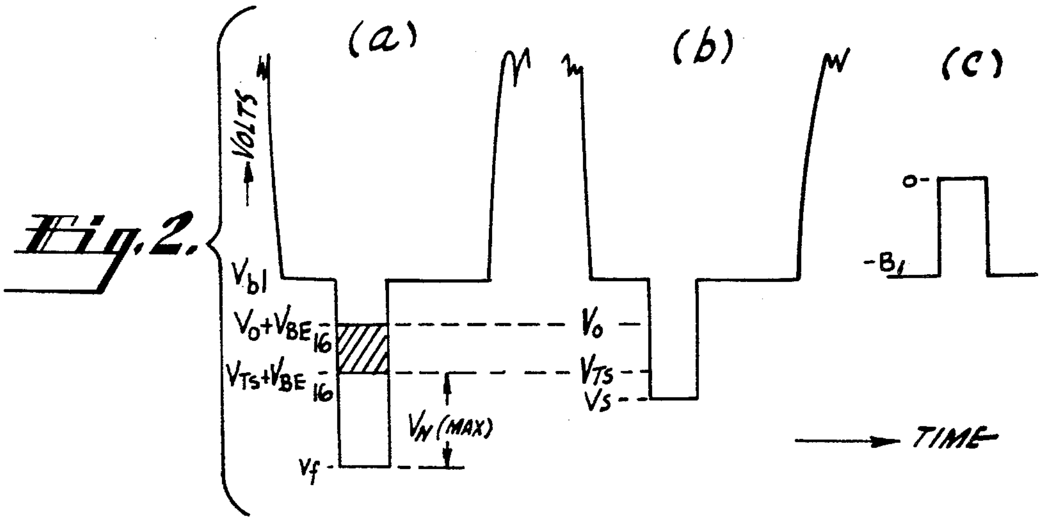
Figure 3:
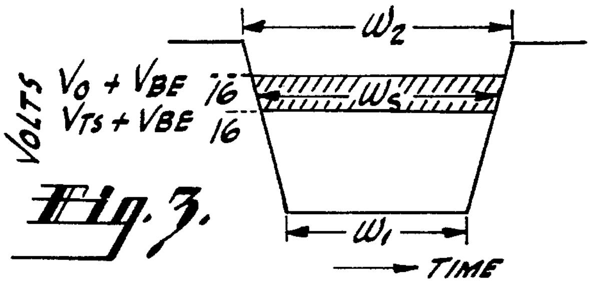

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURE 1 is a schematic diagram of a transistorized sync sripper constructed in accordance with the principles of the present invention;

FIGURES 2(*a*), (*b*), and (*c*) are graphic representations of signal waveforms helpful in understanding the operation of the invention; and FIGURE 3 is a graphic representation of an expanded signal waveform helpful in understanding one of the features of the invention.

Referring to the drawings, and more particularly to FIGURE 1, there is shown a schematic diagram of one embodiment of a transistorized sync stripper constructed in accordance with the invention. In FIGURE 1, an input terminal 10 is provided by means of which a composite video signal—including the synchronizing signal components and video signal components thereof—is supplied to the sync stripper. Connected to the input terminal 10 is one side of capacitor 11, whose other side is connected to a junction point 12. Connected to the junction 12 is the cathode of a diode 13, the anode of which is connected to a source of reference potential, such as ground. Also connected to the junction 12 is one end of a resistor 14, whose other end is connected to a source of negative potential $B_1$. Finally connected to the junction 12 is the input electrode of a coupling stage 15.

Coupling stage 15 includes an NPN transistor 16 having emitter, base, and collector electrodes 17, 18, and 19, respectively. The emitter electrode 17 is connected to one end of a resistor 20, the other end of which is connected to the negative potential source $B_1$. The base elctrode 18 is electrically connected via a conductor 33 to the junction point 12, while the collector electrode 19 is connected to an RC filter circuit 21, 22 and to the end of a resistor 23 remote from a source of positive potential $B_2$. The emitter electrode 17 is further connected to the input of a switching stage 24. As shown in FIGURE 1, transistor 16 is connected in an emitter-follower or common collector configuration.

Switching stage 24 includes a PNP transistor 25 having emitter, base, and collector electrodes 26, 27, and 28, respectively. The emitter electrode 26 is, as shown, connected to a point of reference potential, such as ground, while the base electrode 27 is electrically connected via a conductor 29 to the emitter electrode 17 of NPN transistor 16. The collector electrode 28 is connected to one end of a resistor 30, the other end of which is connected to the negative potential source $B_1$ and, also, via a conductor 31 to an output terminal 32. It is at terminal 32 that the separated synchronizing information will appear. As shown in FIGURE 1, transistor 25 is connected in a common emitter configuration.

In operation, let it be assumed that the sync stripper of FIGURE 1 is to be used in conjunction with a transistorized waveform monitor. Input terminal 10, for such a case, may represent the picture signal output terminal of a camera unit or other suitable source of composite signal information including synchronizing signals. Similarly, output terminal 32 may represent the synchronizing input terminal of the time base generator of an oscilloscope or waveform monitor where television video waveforms are to be displayed and investigated. Let it also be assumed that the composite video signal supplied to input terminal 10 is a sync-negative signal, i.e., one whose synchronizing pulses extend in a negative direction from the blanking level.

With the foregoing assumptions made, the sync-negative composite video signal supplied to input terminal 10 is AC coupled through capacitor 11 to the junction point 12. Diode 13 and resistor 14 comprise a DC restorer circuit which clamps the peaks of the synchronizing pulses, hereafter sync pulses, to a predetermined level at junction 12. Due to the finite forward voltage across the diode 13, this level will be at some slightly negative potential with respect to ground. FIGURE2(a) shows the clamped composite video signal as it might appear at junction point 12. The slightly negative clamp level is shown as the voltage $V_f$.

This clamped signal is then coupled without change along conductor 33 to the base electrode 18 of transistor 16 and from there, by emitter-follower action to the emitter electrode 17. As long as the voltage level at the emitter electrode 17 is more positive than the voltage required to drive the transistor 25 into saturation, herein called the base-to-emitter saturation voltage, the signal at the emitter electrode 17 faithfully follows the signal at the base electrode 18. After the transistor 25 has been driven into saturation, the emitter electrode 17 is clamped at a fixed voltage by the base-emitter circuit of the transistor 25. Thereafter any further negative excursion of the signal applied to the base electrode 18 cuts off the transistor 16. FIGURE 2(*b*) shows the composite video signal as it would appear at the emitter electrode 17 of transistor 16. The voltage level at the emitter electrode 17 corresponding to the maximum negative excursion at the base electrode 18 that will maintain transistor 16 in its normally conducting condition is shown as the voltage $V_S$.

Of the composite video signal coupled to the emitter electrode 17 of transistor 16 and then along conductor 29 to the base electrode 27 of transistor 25, only a portion is effective in causing transistor 25 to conduct. The particular portion is that portion which drives the potential at the base electrode 27 negative with respect to the potential at the emitter electrode 26. The minimum voltage level at the emitter electrode 17 of transistor 16 that will cause transistor 25 to conduct is shown in FIGURE 2(*b*) as the voltage $V_o$. Voltage $V_o$ therefore defines the first limit of this particular conductive portion. Once the signal at the base electrode 27 extends more negative than this $V_o$ level, transistor 25 is rendered conductive. It then is driven more conductive until at a voltage $V_{TS}$ the transistor 25 is driven to the threshold of saturation. Further base drive of the transistor 25 is limited at the voltage $V_S$, the maximum base-emitter saturation voltage. Voltage $V_S$ therefore defines the second limit of the conductive portion of transistor 25. Transistor 25 thus operates as an amplifier during the portion $V_o$ to $V_{TS}$ and is in saturation during the portion $V_{TS}$ to $V_S$.

FIGURE 2(*c*) shows the output signal developed by transistor 25 at its collector electrode 28. As shown, the output signal is a positive going pulse. During the video interval, every point on the composite signal at the base electrode 27 of transistor 25 is more positive than $V_o$ volts (see FIGURE 2(*b*) and transistor 25 remains in its nonconductive condition. During the synchronizing interval, the base electrode 27 is driven below $V_o$ volts and transistor 25 is rendered conductive. The extremities $-B_1$ and zero volts in FIGURE 2(*c*) correspond to these two instances. If, in FIGURE 1, the collector electrode 28 were returned to a negative potential source other than $B_1$, the extremities in FIGURE 2(*c*) would represent the voltage level of that source and substantially zero volts, respectively.

It is readily apparent from the signal waveforms of FIGURE 2(*a*)—(*c*) that the sync stripper of FIGURE 1 develops an output pulse at teminal 32 during and only during the synchronizing interval of the composite vidio signal. It is in this manner that the synchronizing signal information is separated from the video signal information. The output pulse developed at terminal 32 can then be used to synchronize an oscilloscope or waveform monitor, as described.

While applicant does not wish to be limited to any particular set of circuit constants, the following have proved useful in the sync stripper of FIGURE 1:

| | | |
|---|---|---|
| Resistor **14** | kilohms | 33 |
| Resistor **20** | do | 6.2 |
| Resistor **21** | do | 5.6 |
| Resistor **23** | do | 2.2 |
| Resistor **30** | do | 4.7 |
| Capacitor **11** | microfarad | .18 |
| Capacitor **22** | do | .1 |
| Diode **13** | | 1N100 |
| Transistor **16** | | 2N2270 |
| Transistor **25** | | 2N404 |
| Potential $B_1$, (minus) | volts | 20 |
| Potential $B_2$, (plus) | do | 40 |

In addition to the ease and simplicity with which the sync stripper of the present invention can be constructed, as already observed, another of its features is its high immunity to noise occurring during the synchronizing interval and extending in the direction of white. Because of this immunity, a clean separated pulse will be developed at output terminal 32. This can best be understood by considering the signal waveforms of FIGURE 2(*a*)—(*c*).

In FIGURE 2(*b*), $V_{TS}$ represents the voltage at the base electrode 27 of transistor 25 at which transistor 25 first enters saturation. This occurs when the voltage at the base electrode 27 is equal to the voltage at the collector electrode 28. It is this $V_{TS}$ voltage level that noise voltages at the base electrode 27 must exceed before noise disturbances will appear with the stripped synchronizing information at output terminal 32. Thus the shaded area as shown in FIGURE 2(*a*) represents the effective portion of the input synchronizing pulse separated by the sync stripper of FIGURE 1.

Using the symbols and waveforms shown in FIGURE 2, it will be noted that the maximum allowable average noise voltage excursion, $V_{N\,(max)}$, measured from the peaks of the synchronizing pulses towards white can be given by the expression:

$$V_{N\,(max)}=V_{TS}+V_{BE_{16}}-V_f$$

Similarly, the maximum allowable peak-to-peak noise voltage excursions, $V_{p\text{-}p}$, can be given by the expression:

$$V_{p\text{-}p}=2V_{N\,(max)}=2(V_{TS}+V_{BE_{16}}-V_f)$$

In both of these expressions it will be understood that by $V_{BE_{16}}$ is meant the base to emitter voltage drop of transistor 16 during its normally conducting condition and by $V_{TS}$ and $V_f$ are meant the same definitions of voltage as were previously given above. A measure of the noise immunity of the sync stripper of FIGURE 1 relative to the amplitude of the sync pulses can then be calculated from expression:

$$\frac{V_{p\text{-}p}}{V_{sync}}=\frac{2(V_{TS}+V_{BE_{16}}-V_f)}{V_{sync}}$$

It would be informative to know this measure both for minimum and maximum conditions of sync amplitude. Considering the minimum sync condition first, it will be observed that the minimum black level voltage ($V_{bl}$ in FIGURE 2(*a*)) that can be tolerated is that which will render transistor 25 conductive. This voltage can be expressed at the emitter electrode 17 and base electrode 18 of transistor 16, respectively as:

$$V_{bl\,(min)}=V_o$$

and $$V_{bl\,(min)}=V_o+V_{BE_{16}}$$

For this condition, the minimum sync amplitude at the base electrode 18 of transistor 16 can be expressed as:

$$V_{sync\,(min)}=V_{bl\,(min)}-V_f=V_o+V_{BE_{16}}-V_f$$

The measure of noise immunity of the sync stripper of FIGURE 1 for the minimum sync condition is therefore given by the expression:

$$\frac{V_{p\text{-}p}}{V_{sync\,(min)}}=\frac{2(V_{TS}+V_{BE_{16}}-V_f)}{V_o+V_{BE_{16}}-V_f}$$

With the circuit constants chosen as set forth above, it will be found that: $V_o=0$ volt, $V_{BE_{16}}=0.5$ volt, $V_f=-0.25$ volt, and $V_{TS}=-0.25$ volt. Thus, the measure of noise immunity for the minimum sync condition is equal to:

$$\frac{V_{p\text{-}p}}{V_{sync\,(min)}}=\frac{2[-0.25+0.5-(-0.25)]}{0+0.5-(-0.25)}=\frac{1.0}{.75}=1.33$$

Since most transistorized waveform monitors are designed to accept a sync amplitude range of approximately 8/1, the measure of noise immunity for the maximum sync condition equals:

$$\frac{V_{p-p}}{V_{sync\,(max)}}=\frac{V_{p-p}}{8V_{sync\,(min)}}=\frac{1.0}{6.0}=.167$$

These calculations show that for all peak-to-peak noise excursions during the synchronizing interval less than 16.7% of the sync amplitude, the sync stripper of FIGURE 1 will develop a clean, separated output pulse signal at terminal 32. It is to this degree that the sync stripper is noise immune.

It will be apparent from the above expressions that the noise immunity of the sync stripper of FIGURE 1 can be affected in many ways. For example:

(1) By connecting the emitter electrode 26 of transistor 25 to a potential other than ground, the voltage level $V_o$ can be changed;

(2) By choosing a germanium or a silicon transistor for transistor 16 or by the cascading of transistors, the voltage $V_{BE_{16}}$ can be changed; and (3) By clamping the sync pulses at the base electrode 18 of transistor 16 to a potential other than ground, or by using clamp diodes in series, or by choosing germanium or silicon diodes, the voltage $V_f$ can be changed.

These points should therefore be kept in mind when choosing components for use in a sync stripper constructed in accordance with the invention.

Implicit in the construction of the sync stripper of FIGURE 1 are two additional features which further makes its use desirable. First, the use, as part of the DC restorer circuit with diode 13, of a relatively large resistor (14) connected to the negative potential source $B_1$ increases the clamp speed of the sync stripper. This enables the stripper to recover quickly from any undesirable effects that may result due to sudden changes either in the level or duty cycle of the incoming composite video signal. It also enables the sync stripper to operate independently of hum, tilt, and other low frequency disturbances on the incoming signal. Second, the low output impedance of the emitter-follower transistor 16 during its conductive state enables the charge stored in transistor 25 during its saturation interval to be swept out when transistor 25 is driven out of saturation and rendered nonconductive. This maintains proper timing of the trailing edge of the output signal with the ensuing result that a sharp output pulse is developed at the output terminal 32 only during the synchronizing interval of the composite signal.

The invention includes yet another feature. By virtue of its construction, the width of the output pulse developed at terminal 32 is maintained substantially constant, independent of any amplitude variations of the incoming synchronizing pulse. Such a feature is highly desirable where keying pulses are to be derived from the output pulse and used, for example, to stabilize black level in the reproduced television picture. This can be more clearly understood from a consideration of FIGURE 3.

FIGURE 3 shows an expanded waveform of the synchronizing portion of the composite video signal present at the junction point 12, and shown in FIGURE 2(*a*). As was previously mentioned, the shaded area represents the effective portion of the incoming synchronizing pulse separated by the sync stripper. It can be shown that the change in width ($W_S$) of this shaded area as a function of circuit parameters and synchronizing pulse amplitude is given by the expression:

$$\Delta W_S=(W_2-W_1)\left(V_o+V_{BE_{16}}-V_f-\frac{|V_{TS}|}{2}\right)\left(\frac{1}{S_2}-\frac{1}{S_1}\right)$$

In this expression it will be understood that:

(1) $W_1$ represents the width of the synchronizing pulse at the sync tips;

(2) $W_2$ represents the width of the synchronizing pulse at the blanking level;

(3) $S_1$ represents the amplitude of the synchronizing pulse for a first amplitude condition;

(4) $S_2$ represents the amplitude of the synchronizing pulse for a second amplitude condition; and (5) $V_o$, $V_{BE_{16}}$, $V_f$, $V_{TS}$ are as previously defined.

Assuming that $W_2-W_1$ is equal to 0.6 microsecond, a reasonable assumption for the input signal condition, then the change in width $\Delta W_S$ as the synchronizing amplitude changes from the maximum sync condition ($S_1$=6 volts) to the minimum sync condition ($S_2$=.75 volt)

$$\Delta W_S=(0.6)(0+0.5+0.25-0.125)\left(\frac{1}{.75}-\frac{1}{6}\right)$$
$$=.44 \text{ microseconds}$$

Such a change in the width of the incoming synchronizing pulse will produce virtually no change in the width of the output pulse developed by the sync stripper.

While the sync stripper of FIGURE 1 has been described as it would be used with a sync-negative video signal, the teachings of the invention are equally applicable where the incoming signal is a sync-positive signal, i.e., one whose synchronizing pulses extend in a positive direction from the blanking level. Reversals in transistor, diode, and potential source polarities, obvious to those skilled in the art will, of course, have to be made to permit the sync stripper to operate effectively in such an envoronment.

What is claimed is:

1. A transistorized sync stripper comprising:

means for supplying a composite video signal including the synchronizing signal components and video signal components thereof;

a first transistor having an emitter electrode, a base electrode, and a collector electrode connected to provide a switching stage for separating said synchronizing signal components from said video signal components;

a second transistor having an emitter electrode, a base electrode, and a collector electrode connected to provide a coupling stage for coupling said composite signal to said switching stage, with the emitter electrode of said second transistor being electrically connected to the base electrode of said first transistor;

means for clamping the peaks of the synchronizing signal components of said composite signal to a predetermined voltage level at the base electrode of said second transistor; and means for deriving separated synchronizing signal components at the collector electrode of said first transistor.

2. A transistorized sync stripper comprising:

means for supplying a composite video signal including the synchronizing signal components and video signal components thereof;

an output transistor having an emitter electrode, a base electrode, and a collector electrode connected to provide a switching stage for separating said synchronizing signal components from said video signal components;

an input transistor having an emitter electrode, a base electrode, and a collector electrode connected to provide an emitter-follower coupling stage for coupling said composite signal to said switching stage, with the emitter electrode of said input transistor being electrically connected to the base electrode of said output transistor;

means including a forward biased diode for clamping the peaks of the synchronizing signal components of said composite signal to a predetermined voltage level at the base electrode of said input transistor; and means for deriving separated synchronizing signal components at the collector electrode of said output transistor.

3. A transistorized sync stripper comprising:

a first transistor of a first conductivity type having an emitter electrode, a base electrode, and a collector electrode coupled to a source of energizing potential;

a second transistor of a conductivity type complementary to that of said first transistor having an emitter electrode, a base electrode electrically connected to the emitter electrode of said first transistor, and a collector electrode;

means for supplying a composite video signal including the synchronizing signal components and video signal components thereof to the base electrode of said first transistor, for translation to the emitter electrode thereof and thence to the base electrode of said second transistor;

said second transistor being cut off during the video signal component interval of said composite video signal and being driven into saturation during the synchronizing signal component interval, whereby the synchronizing signal information is separated from the video signal information of said composite signal;

means for clamping the peaks of the synchronizing signal components of said composite signal to a predetermined voltage level at the base electrode of said first transistor; and means for deriving the separated synchronizing signal information between the collector and emitter electrodes of said second transistor.

4. A transistorized sync stripper comprising:

a first transistor of a first conductivity type connected in a common collector configuration and having an emitter electrode coupled to a first source of potential, a base electrode, and a collector electrode coupled to a second source of potential;

a second transistor of a conductivity tape complementary to that of said first transistor connected in a common emitter configuration and having an emitter electrode connected to a third source of potential, a base electrode coupled to the emitter electrode of said first transistor, and a collector electrode coupled to a fourth source of potential;

means for supplying a composite video signal including the synchronizing signal components and video signal components thereof to the base electrode of said first transistor for translation to the emitter electrode thereof and thence to the base electrode of said second transistor; and means for clamping the peaks of said synchronizing signal components to a predetermined voltage level at the base electrode of said first transistor.

5. A transistorized sync stripper according to claim 4 in which the first transistor is so biased as to be conductive during the synchronizing signal component interval and video signal component interval of the supplied composite signal while the second transistor is so biased as to be conductive during the synchronizing signal component interval only.

6. A transistorized sync stripper according to claim 4 in which the excursions of the synchronizing signal components of the composite video signal at the emitter electrode of the first transistor is limited by the base-to-emitter saturation voltage of the second transistor.

7. A transistorized sync stripper comprising:

a first NPN transistor having emitter, base, and collector electrodes;

a second PNP transistor having emitter, base and collector electrodes;

a first source of negative potential;

a first resistor connected between said negative potential source and the base electrode of said first transistor;

a second resistor connected between said negative potential source and the emitter electrode of said first transistor;

a third resistor connected between said negative potential source and the collector electrode of said second transistor;

a second source of positive potential;

a fourth resistor connected between said positive potential source and the collector electrode of said first transistor;

a point of reference ground potential connected to the emitter electrode of said second transistor;

a parallel resistance-capacitance circuit connected between said point of ground potential and the collector electrode of said first transistor;

an electrical conductor connected between the emitter electrode of said first transistor and the base electrode of said second transistor;

a diode having its anode electrode connected to said point of ground potential and its cathode electrode connected to the base electrode of said first transistor;

a capacitor having one side connected to the junction of the base electrode of said first transistor, the cathode electrode of said diode, and the end of said first resistor remote from said negative potential source; and means for supplying a composite video signal including the synchronizing signal components and video signal components thereof to the second side of said capacitor;

the sync stripper being so constructed and arranged that the separated synchronizing signal information is developed at the collector electrode of said second transistor.

8. A transistorized sync stripper according to claim 4 in which the clamping means comprises a diode having its cathode electrode connected to the base electrode of the first transistor and its anode electrode connected to ground potential.

References Cited

UNITED STATES PATENTS

| | | | |
|---|---|---|---|
| 2,956,118 | 10/1960 | Goodrich | 328—139 XR |
| 3,240,873 | 3/1966 | Hansen et al. | 178—7.3 |

ARTHUR GAUSS, *Primary Examiner.*

J. ZAZWORSKY, *Assistant Examiner.*